(12) United States Patent
Schadenhofer et al.

(10) Patent No.: US 12,117,140 B2
(45) Date of Patent: Oct. 15, 2024

(54) ILLUMINATION DEVICE FOR VEHICLE HEADLAMP HAVING A LIGHT MODULE AND SHIELD COVER THAT SIMULTANEOUSLY MOVE WITH RESPECT TO EACHOTHER

(71) Applicant: ZKW Group GmbH, Wieselburg (AT)

(72) Inventors: Peter Schadenhofer, Roggendorf (AT); Lars Amundsson, St. Valentin (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/244,032

(22) Filed: Sep. 8, 2023

(65) Prior Publication Data

US 2024/0102630 A1    Mar. 28, 2024

(30) Foreign Application Priority Data

Sep. 28, 2022 (EP) .................................... 22198420

(51) Int. Cl.
*F21S 41/692* (2018.01)
*F21S 41/657* (2018.01)
*F21S 43/19* (2018.01)

(52) U.S. Cl.
CPC ........... *F21S 41/692* (2018.01); *F21S 41/657* (2018.01); *F21S 43/19* (2018.01)

(58) Field of Classification Search
CPC ...... F21S 41/683; F21S 41/686; F21S 41/689; F21S 41/65; F21S 41/657; F21S 41/692; F21S 41/695; F21S 41/698
See application file for complete search history.

(56) References Cited

U.S. PATENT DOCUMENTS

| 5,769,525 A | 6/1998 | Daumueller |
| 2011/0006685 A1 | 1/2011 | Kraft |

(Continued)

FOREIGN PATENT DOCUMENTS

| EP | 1985913 A1 | 10/2008 |
| FR | 2754500 A1 | 4/1998 |

OTHER PUBLICATIONS

MCH Translation of EP 1985913A1.*
Extended European Search Report for European Patent No. 22198420.6 dated Mar. 13, 2023 (11 Pages).

*Primary Examiner* — Robert J May
(74) *Attorney, Agent, or Firm* — Eversheds Sutherland (US) LLP

(57) ABSTRACT

An illumination device for a vehicle headlamp that provides headlamp levelling. The illumination device includes a primary light module configured to emit light in a main direction, wherein the primary light module is rotatable around a rotation axis; a moveable shield cover for shielding the primary light module; and a motion device for moving simultaneously the primary light module around the rotation axis and the shield cover with respect to each other between (a) non-illuminating positions, wherein the shield cover is in front of the primary light module, and (b) illuminating positions, wherein the shield cover is moved away from the light path of the light module. In each illuminating position, the primary light module is in a defined angular position of a determined operating angular range around the rotation axis to project the light distribution in different angular positions in front of the illumination device for headlamp levelling.

17 Claims, 2 Drawing Sheets

(56) References Cited

U.S. PATENT DOCUMENTS

2012/0051070 A1    3/2012   Bakacha et al.
2014/0063834 A1    3/2014   Guan et al.
2017/0089538 A1    3/2017   Wasilewski et al.

* cited by examiner

ILLUMINATION DEVICE FOR VEHICLE HEADLAMP HAVING A LIGHT MODULE AND SHIELD COVER THAT SIMULTANEOUSLY MOVE WITH RESPECT TO EACHOTHER

CROSS-REFERENCE TO RELATED APPLICATIONS

This application claims priority to European Patent Application No. 22198420.6, filed Sep. 28, 2022, which is incorporated herein by reference.

FIELD OF THE INVENTION AND DESCRIPTION OF PRIOR ART

The invention relates to an illumination device for a vehicle headlamp, wherein the illumination device provides headlamp levelling for a vehicle headlamp.

The invention also relates to a vehicle headlamp comprising at least one illumination device according to the invention.

There is an increased desire to provide an illumination device that allows increased safety so that no light from a light module is unintentionally emitted in front of the illumination device while providing headlamp levelling for a vehicle headlamp.

For this purpose, there are several proposed solutions in the state of the art, which, however, are not satisfactory.

SUMMARY OF THE INVENTION

It is an object of the invention to provide an enhanced illuminating device.

One Aspect of the Invention

To achieve this object, the illuminating device comprises:
at least one primary light module configured to emit light along a light path in a main direction in order to project a light distribution, preferably a low beam and/or high beam light distribution, in front of the illumination device, in particular onto a road, wherein the at least one primary light module is rotatable around a rotation axis,
a moveable shield cover for shielding the at least one primary light module in order to prevent the at least one primary light module to emit light in the main direction in front of the illumination device,
a motion device for moving simultaneously the at least one primary light module around the rotation axis and the shield cover with respect to each other between
non-illuminating positions of the at least one primary light module, wherein the shield cover is—seen in the main direction—in front of the at least one primary light module blocking the light path of the at least one primary light module in order to prevent the at least one primary light module to emit light in front of the illumination device, and
illuminating positions of the at least one primary light module, wherein the shield cover is moved away from the light path of the at least one primary light module to unblock the light path of the at least one primary light module in the main direction in order to allow the at least one primary light module to emit light in front of the illumination device,
a frame, which is stationary in relation to the movements of the at least one primary light module and the shield cover, wherein the motion device is mounted on the frame,
wherein in each illuminating position, the at least one primary light module is in a defined angular position of a determined operating angular range around the rotation axis in order to project the light distribution in different angular positions in front of the illumination device to allow a headlamp levelling for a vehicle headlamp.

This solution allows that even if there is a malfunction in which light of the at least one primary light module is emitted despite being switched off, it is not emitted in front of the lighting device.

In addition, this solution also meets design requirements, whereby the at least one primary light module not in use is not visible from the outside.

Furthermore, the solution according to the invention makes it possible to regulate the headlight levelling while shading the at least one primary light module when required.

Advantageously, the operating angular range corresponds to an angle range along the V-V line on a measuring screen from 0° to −20°, preferably the measuring screen is conforming to ECE guidelines.

Advantageously, the shield cover maintains its spatial orientation while transitioning between the non-illuminating positions and the illuminating positions.

Advantageously, the shield cover is moveable substantially in a vertical direction—seen in a correct installed state of the illumination device in a vehicle.

Advantageously, the motion device comprises a levelling motor configured to drive simultaneously the movement of the at least one primary light module and the shield cover.

Advantageously, the motion device comprises a linking mechanism configured to link the at least one primary light module and the shield cover in such a way that driving the linking mechanism causes a simultaneous movement of the at least one primary light module and the shield cover.

Advantageously, the illumination device comprises a front cover, preferably an opaque front cover, having a translucent section, and wherein the front cover is arranged downstream of the at least one primary light module in the main direction, wherein in the illuminating positions the at least one primary light module emits light through the translucent section in front of the illumination device.

Advantageously, the illumination device comprises a housing for housing the at least one primary light module and the shield cover, wherein the housing comprises the front cover.

Advantageously, in the non-illuminating positions, the shield cover is also blocking the translucent section of the front cover in order to prevent the at least one primary light module to emit light in front of the illumination device, wherein in the illuminating positions the shield cover is moved away from the translucent section of the front cover.

Advantageously, the translucent section of the front cover is built as an opening, which passes through the front cover.

A Further Aspect of the Invention

To achieve this object, the illuminating device comprises:
at least one primary light module configured to emit light along a light path in the main direction in order to project a light distribution, preferably a low beam light distribution, in front of the illumination device, in particular onto a road, wherein the at least one primary light module is rotatable around a rotation axis, a front cover, preferably an opaque front cover, having a translucent section, and wherein the front cover is arranged downstream of the at least one primary light module in the main direction, a moveable shield cover for shielding the translucent section of the front cover in order to prevent the at least one primary light module to emit light in the main direction in front of the illumination device, a motion device for moving simultaneously the at least one primary light module around the rotation axis and the shield cover with respect to each other between non-illuminating positions of the at least one primary light module, wherein the at least one primary light module is covered by the front cover blocking the light path of the at least one primary light module, and wherein the shield cover is blocking the translucent section of the front cover in order to prevent the at least one primary light module to emit light in front of the illumination device, illuminating positions of the at least one primary light module, wherein the shield cover is moved away from the translucent section of the front cover and the at least one primary light module is unblocked of the front cover in order to allow the at least one primary light module to emit light in the main direction through the translucent section of the front cover in front of the illumination device, a frame, which is stationary in relation to the movements of the at least one primary light module and the shield cover, wherein the motion device is mounted on the frame, wherein in each illuminating position the at least one primary light module is in a defined angular position of a determined operating angular range around the rotation axis in order to project the light distribution in different angular positions in front of the illumination device to allow a headlamp levelling for a vehicle headlamp.

Advantageously, the illumination device comprises a housing for housing the at least one primary light module, the secondary light module, and the shield cover, wherein the housing comprises the front cover.

Advantageously, the illumination device comprises at least one secondary light module configured to emit light along a light path in order to project a light distribution in front of the illumination device, wherein the at least one secondary light module is rotatable around the rotation axis, wherein the motion device is configured to simultaneously move the at least one primary light module and the at least one secondary light module around the rotation axis and the shield cover with respect to each other between the non-illuminating positions, wherein the at least one primary light module and the at least one secondary light module are covered by the front cover blocking the light path of the at least one primary light module and the at least one secondary light module, and wherein the shield cover is blocking the translucent section of the front cover in order to prevent the at least one primary light module and the at least one secondary light module to emit light in front of the illumination device, an intermediate position, wherein the at least one primary light module is covered by the front cover blocking the light path of the at least one primary light module, wherein the shield cover is moved away from the translucent section of the front cover in a way to allow the at least one secondary light module to emit light in the main direction through the translucent section of the front cover in front of the illumination device, the illuminating positions of the at least one primary light module, wherein the shield cover is moved away from the translucent section of the front cover and the at least one primary light module is unblocked of the front cover in order to allow the at least one primary light module to emit light in the main direction through the translucent section of the front cover in front of the illumination device, and wherein the shield cover or the front cover blocking the light path of the at least one secondary light module in order to prevent the at least one secondary light module to emit light in front of the illumination device through the translucent section of the front cover.

Advantageously, the at least one secondary light module is configured to emit a light distribution in front of the illumination device different from the light distribution of the at least one primary light module, preferably the light distribution of the at least secondary light module is a position light, a daytime running light, a sign light, or a turn indicator.

This solution allows that even if there is a malfunction in which light of the light module is emitted despite being switched off, it is not emitted in front of the lighting device.

In addition, this solution also meets design requirements, whereby the at least one primary light module not in use is not visible from the outside.

Furthermore, the solution according to the invention makes it possible to regulate the headlight levelling while shading the at least one primary light module when required.

Advantageously, the operating angular range corresponds to an angle range along the V-V line on a measuring screen from 0° to −20°, preferably the measuring screen is conforming to ECE guidelines.

Advantageously, the shield cover maintains its spatial orientation while transitioning between the non-illuminating positions and the illuminating positions.

Advantageously, the shield cover is moveable substantially in a vertical direction—seen in a correct installed state of the illumination device in a vehicle.

Advantageously, the motion device comprises a levelling motor configured to drive simultaneously the movement of the at least one primary light module and the shield cover.

Advantageously, the motion device comprises a linking mechanism configured to link the at least one primary light module and the shield cover in such a way that driving the linking mechanism causes a simultaneous movement of the at least one primary light module and the shield cover.

Advantageously, the motion device comprises a linking mechanism configured to link the at least one primary light module, the at least one secondary light module and the shield cover in such a way that driving the linking mechanism causes a simultaneous movement of the at least one primary light module, the at least one secondary light module and the shield cover.

Advantageously, the translucent section of the front cover is built as an opening, which passes through the front cover.

The object is also achieved by a vehicle headlamp comprising at least one illumination device according to the invention.

It should be noted, that—unless otherwise stated—explanations and features which refer to one aspect of the invention also refer to the other aspect of the invention, and vice versa.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

FIG. 1 to FIG. 4 shows an example of an illumination device 10 for a vehicle headlamp, wherein the illumination device 10 provides headlamp levelling for a vehicle headlamp. The illumination device 10 comprises one primary light module 100 configured to emit light along a light path in a main direction X in order to project a light distribution, preferably a low beam and/or high beam light distribution, in front of the illumination device 10, in particular onto a road, wherein the primary light module 100 is rotatable around a rotation axis RA.

Further, the illumination device 10 comprises a moveable shield cover 200 for shielding the primary light module 100 in order to prevent the primary light module 100 to emit light in the main direction X in front of the illumination device 10.

Moreover, the illumination device 10 comprises a motion device 300 for moving simultaneously the primary light module 100 around the rotation axis RA and the shield cover 200 with respect to each other between non-illuminating positions P1a, P2a and illuminating positions P3a, P4a.

In the non-illuminating positions P1a, P2a of the primary light module 100, the shield cover 200 is—seen in the main direction X—in front of the primary light module 100 blocking the light path of the primary light module 100 in order to prevent the primary light module 100 to emit light in front of the illumination device 10.

Figure 1:
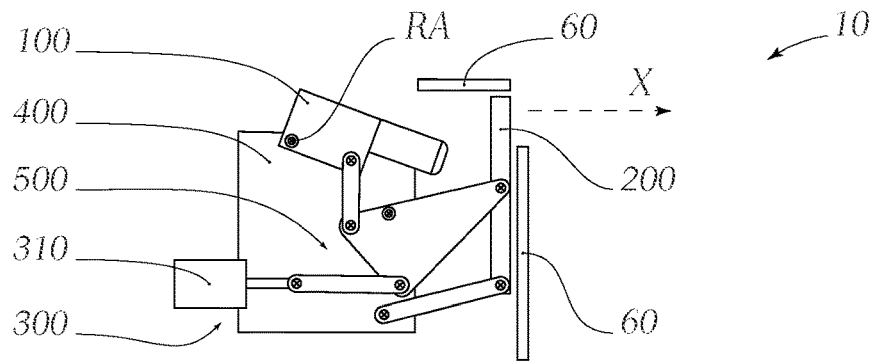
FIG. 1 an example of an illumination device according to the invention, comprising a primary light module, a moveable shield cover and a motion device, wherein the motion device is configured to simultaneously move the primary light module around a rotation axis and the shield cover with respect to each other, wherein in the shown figure the illumination device is in a non-illuminating position of the primary light module, in which the shield cover is in front the primary light module.
Figure 2:
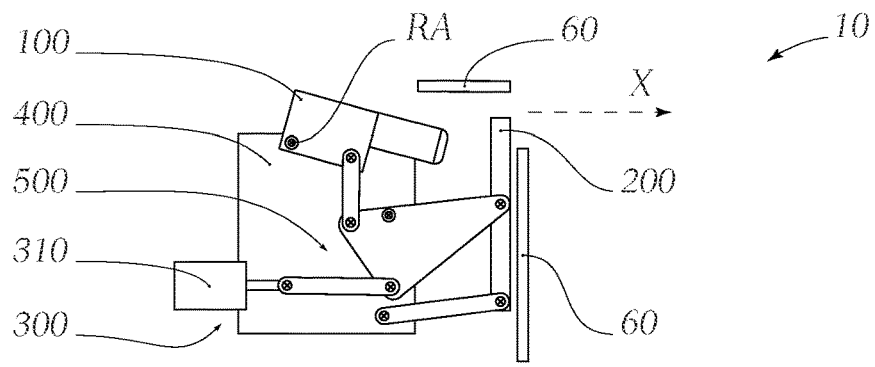
FIG. 2 the illumination device of FIG. 1 in a further non-illuminating position of the primary light module, wherein the angular position of the primary light module is different to the angular position in FIG. 1.

FIG. 1 and FIG. 2 show both non-illuminating positions P1a, P2a of the primary light module 100.

In the illuminating positions P3a, P4a of the primary light module 100, the shield cover 200 is moved away from the light path of the primary light module 100 to unblock the light path of the primary light module 100 in the main direction X in order to allow the primary light module 100 to emit light in front of the illumination device 10.

Figure 3:
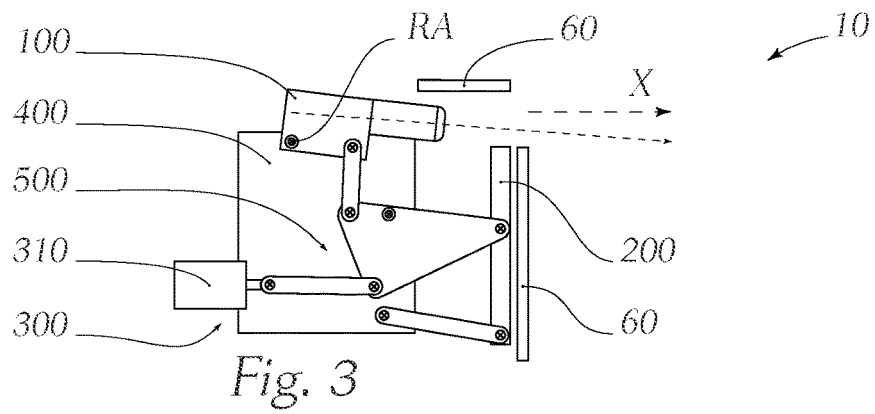
FIG. 3 the illumination device of FIGS. 1 and 2 in an illuminating position of the primary light module, wherein the shield cover is moved away from the light path of the primary light module in order to allow the primary light module to emit light in front of the illumination device.
Figure 4:
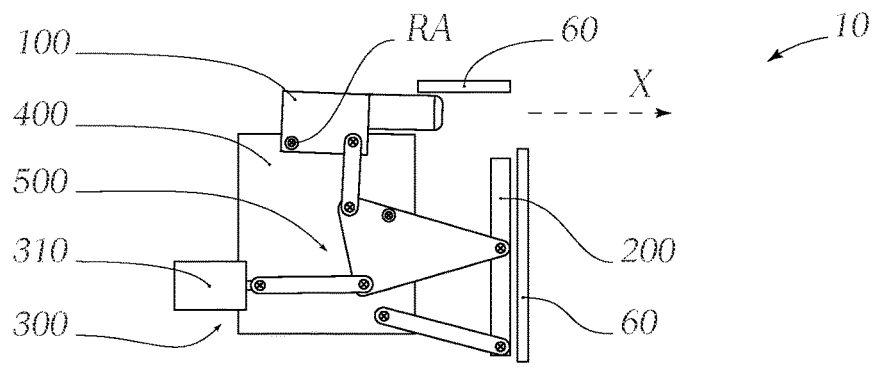
FIG. 4 the illumination device of FIGS. 1, 2 and 3 in a further illuminating position of the primary light module.

FIG. 3 and FIG. 4 show both illuminating positions P3a, P4a of the primary light module 100, wherein the primary light module 100 is in a different defined angular position around the rotation axis RA.

The motion device 300 comprises a linking mechanism 500 configured to link the primary light module 100 and the shield cover 200 in such a way that driving the linking mechanism 500 causes a simultaneous movement of the primary light module 100 and the shield cover 200. Further, the motion device 300 comprises a levelling motor 310 configured to drive simultaneously the movement of the primary light module 100 and the shield cover 200.

Further, the illumination device 10 comprises a frame 400, which is stationary in relation to the movements of the primary light module 100 and the shield cover 200, wherein the motion device 300 is mounted on the frame 400.

In each illuminating position P3a, P4a the at least one primary light module 100 is in a defined angular position of a determined operating angular range around the rotation axis RA in order to project the light distribution in different angular positions in front of the illumination device 10 to allow a headlamp levelling for a vehicle headlamp. The operating angular range may correspond to an angle range along the V-V line on a measuring screen from 0° to −20°.

The shield cover 200 maintains its spatial orientation while transitioning between the non-illuminating positions P1a, P2a and the illuminating positions P3a, P4a, wherein the shield cover 200 is moveable substantially in a vertical direction—seen in a correct installed state of the illumination device 10 in a vehicle.

Further, the illumination device 10 comprises a housing for housing the primary light module 100, wherein the housing comprises an opaque front cover 60 having a translucent section 61, and wherein the front cover 60 is arranged downstream of the primary light module in the main direction X, wherein in the illuminating positions P3a, P4a the primary light module 100 emits light through the translucent section 61 in front of the illumination device 10.

In the non-illuminating positions P1a, P2a the shield cover 200 is also blocking the translucent section 61 of the front cover 60 in order to prevent the primary light module 100 to emit light in front of the illumination device 10, wherein in the illuminating positions P3a, P4a the shield cover 200 is moved away from the translucent section 61 of the front cover 60.

Figure 5:
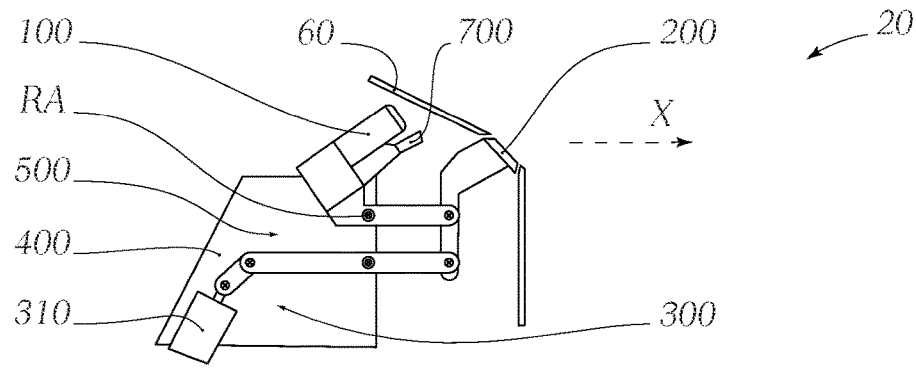
FIG. 5 a further example of an illumination device according to the invention, wherein the illumination device is similar to the device shown in FIGS. 1 to 4, wherein the illumination device comprises a secondary light module and a housing with an opaque front cover which comprises a translucent section, wherein the shown illumination device is in a non-illuminating position of the primary light module and the secondary light module.
Figure 6:
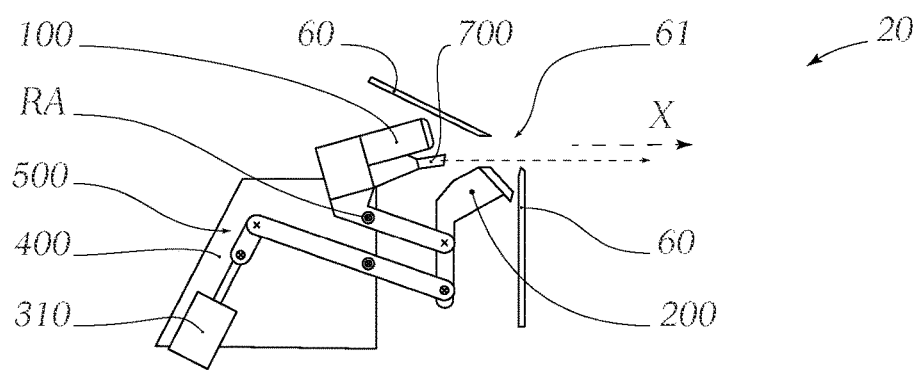
FIG. 6 the illumination device of FIG. 5 in an intermediate position, where the primary light module is covered by the opaque front and the secondary light module is able to emit light through the translucent section of the front cover.
Figure 7:
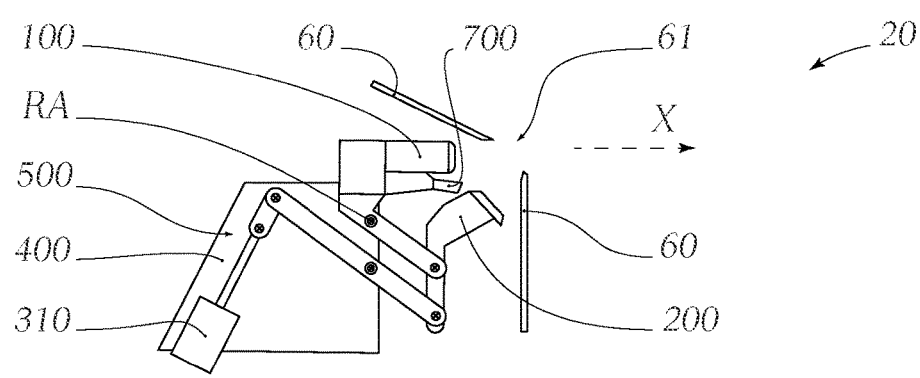
FIG. 7 the illumination device of FIGS. 5 and 6 in an illuminating position of the primary light module, wherein the secondary light module is covered by the shield cover.

FIG. 5 to FIG. 7 shows another example of an illumination device 20 for a vehicle headlamp, wherein the illumination device 20 provides headlamp levelling for a vehicle headlamp, and wherein the illumination device 20 comprises a primary light module 100 configured to emit light along a light path in a main direction X in order to project a light distribution, preferably a low beam and/or high beam light distribution, in front of the illumination device 20, in particular onto a road, wherein the primary light module 100 is rotatable around a rotation axis RA.

The illumination device 20 comprises a housing for housing the primary light module 100, wherein the housing comprises an opaque front cover 60 having a translucent section 61, and wherein the front cover 60 is arranged downstream of the primary light module 100 in the main direction X.

Further, the illumination device 20 comprises a moveable shield cover 200 for shielding the translucent section 61 of the front cover 60 in order to prevent the at least one primary light module 100 to emit light in the main direction X in front of the illumination device 10.

Moreover, the illumination device 20 comprises a secondary light module 700 configured to emit light along a light path in order to project a light distribution in front of the illumination device 20, wherein the secondary light module 700 is rotatable around the rotation axis RA. The secondary light module 700 is configured to emit a light distribution in front of the illumination device 20 different from the light distribution of the at least one primary light module 100, preferably the light distribution of the secondary light module 700 is a position light, a daytime running light, a sign light, or a turn indicator.

The illumination device 20 also comprises a motion device 300 for moving simultaneously the light primary module 100 and the secondary light module 700 around the rotation axis RA and the shield cover 200 with respect to each other between non-illuminating positions P1b, intermediate positions P2b and illuminating positions P3b of the primary light module 100.

In the non-illuminating positions P1b, the primary light module 100 and the secondary light module 700 are covered by the front cover 60 blocking the light path of the primary light module 100 and the secondary light module 700, wherein the shield cover 200 is blocking the translucent section 61 of the front cover 60 in order to prevent the primary light module 100 and the secondary light module 700 to emit light in front of the illumination device 20. FIG. 5 shows such non-illuminating position P1b of the primary light module 100 and secondary light module 700.

In the intermediate position P2b, the primary light module 100 is covered by the opaque front cover 60 blocking the light path of the primary light module 100, wherein the shield cover 200 is moved away from the translucent section 61 of the front cover 60 in a way to allow the secondary light module 700 to emit light in the main direction X through the translucent section 61 of the front cover 60 in front of the illumination device 20. FIG. 6 shows such an intermediate position P2b.

In the illuminating positions P3b of the primary light module 100, the shield cover 200 is moved away from the translucent section 61 of the front cover 60 and the primary light module 100 is unblocked of the front cover 60 in order to allow the primary light module 100 to emit light in the main direction X through the translucent section 61 of the front cover 60 in front of the illumination device 20, and wherein the shield cover 200 or the front cover 60 blocking the light path of the secondary light module 700 in order to prevent the secondary light module 700 to emit light in front of the illumination device 20 through the translucent section 61 of the front cover 60. FIG. 7 shows such an illuminating position P3b of the primary light module 100, wherein the primary light module 100 is in a defined angular position around the rotation axis RA.

The motion device 300 comprises a linking mechanism 500 configured to link the light primary module 100, the secondary light module 700 and the shield cover 200 in such a way that driving the linking mechanism 500 causes a simultaneous movement of the primary light module 100, the secondary light module 700 and the shield cover 200.

Further, the motion device 300 comprises a levelling motor 310 configured to drive simultaneously the movement of the primary light module 100, the secondary module 700 and the shield cover 200.

Further, the illumination device 20 comprises a frame 400, which is stationary in relation to the movements of the primary light module 100, the secondary light module and the shield cover 200, wherein the motion device 300 is mounted on the frame 400.

In each illuminating position P3b the primary light module 100 is in a defined angular position of a determined operating angular range around the rotation axis RA in order to project the light distribution in different angular positions in front of the illumination device 20 to allow a headlamp levelling for a vehicle headlamp. The operating angular range may correspond to an angle range along the V-V line on a measuring screen from 0° to −20°.

The shield cover 200 maintains its spatial orientation while transitioning between the non-illuminating positions P1b, the intermediate position P2b and the illuminating positions P3b, wherein the shield cover 200 is moveable substantially in a vertical direction—seen in a correct installed state of the illumination device 20 in a vehicle.

LIST OF REFERENCE SIGNS

Illumination device . . . 10, 20
Front cover . . . 60
Translucent section . . . 61
Primary light module . . . 100
Movable shield cover . . . 200
Motion device . . . 300
Leveling motor . . . 310
Frame . . . 400
Linking mechanism . . . 500
Secondary light module . . . 700
Main direction . . . X
Rotation Axis . . . RA
Non-illuminating positions . . . P1a, P2a, P1b
Intermediate position . . . P2b
Illuminating positions . . . P3a, P4a, P3b That which is claimed is:

1. An illumination device (10) for a vehicle headlamp, wherein the illumination device (10) provides headlamp levelling for a vehicle headlamp, the illumination device (10) comprising:
at least one primary light module (100) configured to emit light along a light path in a main direction (X) in order to project a light distribution in front of the illumination device (10), in particular onto a road, wherein the at least one primary light module (100) is rotatable around a rotation axis (RA);
a moveable shield cover (200) for shielding the at least one primary light module (100) in order to prevent the at least one primary light module (100) to emit light in the main direction (X) in front of the illumination device (10);
a motion device (300) configured to simultaneously move the at least one primary light module (100) around the rotation axis (RA) and the shield cover (200) with respect to each other between:
non-illuminating positions (P1a, P2a) of the at least one primary light module (100), wherein the shield cover (200) is—seen in the main direction (X)—in front of the at least one primary light module (100) blocking the light path of the at least one primary light module (100) in order to prevent the at least one primary light module (100) to emit light in front of the illumination device (10), and illuminating positions (P3*a*, P4*a*) of the at least one primary light module (100), wherein the shield cover (200) is moved away from the light path of the at least one primary light module (100) to unblock the light path of the at least one primary light module (100) in the main direction (X) in order to allow the at least one primary light module (100) to emit light in front of the illumination device (10); and a frame (400), which is stationary in relation to the movements of the at least one primary light module (100) and the shield cover (200), wherein the motion device (300) is mounted on the frame (400), wherein in each illuminating position (P3*a*, P4*a*) the at least one primary light module (100) is in a defined angular position of a determined operating angular range around the rotation axis (RA) in order to project the light distribution in different angular positions in front of the illumination device (10) to allow a headlamp levelling for a vehicle headlamp, wherein the illumination device (10, 20) comprises a front cover (60) having a translucent section (61), and wherein the front cover (60) is arranged downstream of the at least one primary light module (100) in the main direction (X), wherein in the illuminating positions (P3*a*, P4*a*) the at least one light module (100) emits light through the translucent section (61) in front of the illumination device (10), and wherein in the non-illuminating positions (P1*a*, P1*b*, P2*a*) the shield cover (200) is also blocking the translucent section (61) of the front cover (60) in order to prevent the at least one primary light module (100) to emit light in front of the illumination device (10, 20), wherein in the illuminating positions (P3*a*, P4*a*, P3*b*) the shield cover (200) is moved away from the translucent section (61) of the front cover (60).

2. The illumination device (10, 20) according to claim 1, wherein the operating angular range corresponds to an angle range along a V-V line on a measuring screen from 0° to −20°.

3. The illumination device (10, 20) according to claim 1, wherein the shield cover (200) is configured to maintain its spatial orientation while transitioning between the non-illuminating positions (P1*a*, P2*a*) and the illuminating positions (P3*a*, P4*a*).

4. The illumination device (10, 20) according to claim 1, wherein the shield cover (200) is moveable substantially in a vertical direction—seen in a correct installed state of the illumination device (10, 20) in a vehicle.

5. The illumination device (10, 20) according to claim 1, wherein the motion device (300) comprises a levelling motor (310) configured to drive simultaneously the movement of the at least one primary light module (100) and the shield cover (200).

6. The illumination device (10, 20) according to claim 1, wherein the motion device (300) comprises a linking mechanism (500) configured to link the primary light module (100) and the shield cover (200) in such a way that driving the linking mechanism (500) causes a simultaneous movement of the primary light module (100) and the shield cover (200).

7. A vehicle headlamp comprising at least one illumination device (10, 20) according to claim 1.

8. The illumination device (10) according to claim 1, wherein the light distribution is a low beam light distribution.

9. The illumination device (10) according to claim 1, wherein the front cover (60) is an opaque front cover (60).

10. An illumination device (20) for a vehicle headlamp, wherein the illumination device (20) provides headlamp levelling for a vehicle headlamp, the illumination device (20) comprising:

at least one primary light module (100) configured to emit light along a light path in a main direction (X) in order to project a light distribution in front of the illumination device (20), in particular onto a road, wherein the at least one primary light module (100) is rotatable around a rotation axis (RA);

a front cover (60) having a translucent section (61), and wherein the front cover (60) is arranged downstream of the at least one primary light module (100) in the main direction (X);

a moveable shield cover (200) for shielding the translucent section (61) of the front cover (60) in order to prevent the at least one primary light module (100) to emit light in the main direction (X) in front of the illumination device (20);

a motion device (300) for moving simultaneously the at least one light primary module (100) around the rotation axis (RA) and the shield cover (200) with respect to each other between:

non-illuminating positions (P1*b*) of the at least one primary light module (100), wherein the at least one primary light module (100) is covered by the front cover (60) blocking the light path of the at least one primary light module (100), and wherein the shield cover (200) is blocking the translucent section (61) of the front cover (60) in order to prevent the at least one primary light module (100) to emit light in front of the illumination device (20), and illuminating positions (P3*b*) of the at least one primary light module (100), wherein the shield cover (200) is moved away from the translucent section (61) of the front cover (60) and the at least one primary light module (100) is unblocked of the front cover (60) in order to allow the at least one primary light module (100) to emit light in the main direction (X) through the translucent section (61) of the front cover (60) in front of the illumination device (20), and a frame (400), which is stationary in relation to the movements of the at least one primary light module (100) and the shield cover (200), wherein the motion device (300) is mounted on the frame (400), wherein in each illuminating position (P3*b*) the at least one primary light module (100) is in a defined angular position of a determined operating angular range around the rotation axis (RA) in order to project the light distribution in different angular positions in front of the illumination device (20) to allow a headlamp levelling for a vehicle headlamp, wherein the illumination device (20) comprises at least one add-on light module (700) configured to emit light along a light path in order to project a light distribution in front of the illumination device (20), wherein the at least one add-on light module (700) is rotatable around the rotation axis (RA), wherein:

the motion device is configured to simultaneously move the at least one light module (100) and the at least one add-on light module (700) around the rotation axis (RA) and the shield cover (200) with respect to each other between:

the non-illuminating positions (P1*b*), wherein the at least one light module (100) and the at least one add-on light module (700) are covered by the front cover (60) blocking the light path of the at least one light module (100) and the at least one add-on light module (700), and wherein the shield cover (200) is blocking the translucent section of the front cover (60) in order to prevent the at least one light module (100) and the at least one add-on light module (700) to emit light in front of the illumination device (20), and an intermediate position (P2*b*), wherein the at least one light module (100) is covered by the opaque front cover (60) blocking the light path of the at least one light module (100), wherein the shield cover (200) is moved away from the translucent section (61) of the front cover (60) in a way to allow the at least one add-on light module (700) to emit light in the main direction (X) through the translucent section (61) of the front cover (60) in front of the illumination device (20), the illuminating positions (P3*b*) of the at least one light module (100), wherein the shield cover (200) is moved away from the translucent section (61) of the front cover (60) and the at least one light module (100) is unblocked of the front cover (60) in order to allow the at least one light module (100) to emit light in the main direction (X) through the translucent section (61) of the front cover (60) in front of the illumination device (20), and the shield cover (200) or the front cover (60) blocking the light path of the at least one add-on light module (700) in order to prevent the at least one add-on light module (700) to emit light in front of the illumination device (20) through the translucent section (61) of the front cover (60).

11. The illumination device (20) according to claim 10, wherein the at least one secondary module (700) is configured to emit a light distribution in front of the illumination device (20) different from the light distribution of the at least one primary light module (100).

12. The illumination device (20) according to claim 11, wherein the light distribution of the at least secondary light module (700) is a position light, a daytime running light, a sign light, or a turn indicator.

13. The illumination device (20) according to claim 10, wherein the motion device (300) comprises a levelling motor (310) configured to drive simultaneously the movement of the at least one primary light module (100), the secondary light module (700) and the shield cover (200).

14. The illumination device (20) according to claim 10, wherein the motion device (300) comprises a linking mechanism (500) configured to link the at least one primary light module (100), the at least one secondary light module (700) and the shield cover (200) in such a way that driving the linking mechanism (500) causes a simultaneous movement of the at least one primary light module (100), the at least one secondary light module (700) and the shield cover (200).

15. A vehicle headlamp comprising at least one illumination device (10, 20) according to claim 10.

16. The illumination device (10) according to claim 10, wherein the front cover (60) is an opaque front cover (60).

17. The illumination device (20) according to claim 10, wherein the light distribution is a low beam light distribution.

* * * * *